United States Patent
Christopher et al.

(10) Patent No.: US 6,792,933 B2
(45) Date of Patent: Sep. 21, 2004

(54) DRIVE CONE FOR PAINTBALL LOADER

(75) Inventors: James T. Christopher, Garland, TX (US); Chris T. Goddard, Lewisville, TX (US)

(73) Assignee: National Paintball Supply, Inc., Sewell, NJ (US)

(*) Notice: Subject to any disclaimer, the term of this patent is extended or adjusted under 35 U.S.C. 154(b) by 0 days.

(21) Appl. No.: 09/949,440

(22) Filed: Sep. 7, 2001

(65) Prior Publication Data

US 2002/0014230 A1 Feb. 7, 2002

Related U.S. Application Data

(63) Continuation-in-part of application No. 09/689,573, filed on Oct. 12, 2000, now Pat. No. 6,502,567, which is a continuation-in-part of application No. 09/465,440, filed on Dec. 16, 1999, now Pat. No. 6,213,110.

(51) Int. Cl.[7] ............................................. F41B 11/02
(52) U.S. Cl. ........................................... 124/56; 124/48
(58) Field of Search ......................... 124/56, 41.1, 45, 124/42, 47, 48, 49, 50, 51.1, 53, 73, 74; 221/277

(56) References Cited

U.S. PATENT DOCUMENTS

| | | | |
|---|---|---|---|
| 1,743,576 A | * | 1/1930 | Smith ........................ 124/72 |
| 5,353,712 A | * | 10/1994 | Olson |
| 5,542,570 A | * | 8/1996 | Nottingham et al. ....... 221/192 |
| 5,722,383 A | | 3/1998 | Tippmann, Sr. et al. ...... 124/76 |
| 5,749,797 A | * | 5/1998 | Sunseri et al. |
| 5,887,578 A | * | 3/1999 | Backeris et al. |
| 5,947,100 A | | 9/1999 | Anderson ..................... 124/45 |
| 5,954,042 A | | 9/1999 | Harvey ...................... 124/51.1 |
| 6,109,252 A | | 8/2000 | Stevens ..................... 124/51.1 |
| 6,213,110 B1 | * | 4/2001 | Christopher et al. .......... 124/48 |
| 6,305,367 B1 | | 10/2001 | Kotsiopoulos et al. ........ 124/49 |
| 6,327,953 B1 | | 12/2001 | Andresen ................... 89/33.17 |
| 6,347,621 B1 | * | 2/2002 | Guthrie |
| 6,415,781 B1 | * | 7/2002 | Perrone ..................... 124/51.1 |
| 6,488,019 B2 | * | 12/2002 | Kotsiopoulos ............. 124/51.1 |

* cited by examiner

Primary Examiner—Michael J. Carone
Assistant Examiner—Troy Chambers
(74) Attorney, Agent, or Firm—Drinker, Biddle & Reath LLP (57) ABSTRACT

A drive cone for use on a paintball loader loading paintballs into a conventional paintball gun. The drive cone is located at a bottom portion of the container and is rotated by a motor. The drive cone includes at least one fin which forms a gap for which a plurality of paintballs may fit. The drive cone feeds the paintballs into an exit tube located at the bottom of the container which feeds into the paintball gun.

24 Claims, 9 Drawing Sheets

DRIVE CONE FOR PAINTBALL LOADER

RELATED APPLICATIONS

This application is a continuation-in-part of a U.S. patent application (Ser. No. 09/689,573, entitled "Rapid Feed Paintball Loader With Pivotable Deflector," filed Oct. 12, 2000 in the names of James T. Christopher and Albert G. Schilling now U.S. Pat. No. 6,502,567, which is a continuation-in-part of U.S. patent Ser. No. 09/465,440, filed Dec. 16, 1999 in the names of James T. Christopher and Albert G. Schilling and now U.S. Pat. No. 6,213,110, which is hereby incorporated in its entirety by reference herein.

BACKGROUND OF THE INVENTION

1. Technical Field of the Invention

This invention relates to paintball loaders, and more particularly, to a drive cone for use on a paintball loader for feeding paintballs into a paintball gun.

2. Description of Related Art

A popular war game has developed over the years, which uses paintball guns. Players use the paintball guns to shoot paintballs. These paintballs are gelatin-covered spherical capsules filled with paint. During play of the game, the players on each team advance towards each other. A player is eliminated from the game when the player is hit by a paintball fired from an opposing player's gun. When the paintball hits a player, a "splat" of paint is left on the player.

Typically, an existing paintball loader includes a housing which is placed on an upper portion of a paintball gun. The housing is shaped to hold a large quantity of paintballs. At the bottom of the housing is an outlet tube through which the paintballs drop by the force of gravity. The outlet tube leads to an inlet tube located on the upper portion of the gun.

During the operation of existing paintball loaders, paintballs sequentially drop by gravity through the outlet tube into the inlet tube of the gun. The inlet tube directs each paintball into the firing chamber of the gun, where the paintball is propelled outwardly from the gun by compressed air.

U.S. patent application Ser. No. 09/689,573 ('573) describes a paintball feed system providing enhanced performance over existing paintball feed systems. Additionally, '573 discloses a paintball loader which reliably and forcibly delivers paintballs to a paintball gun at a rapid, selectable rate, while actively preventing paintball jams. However, paintball jams may still occur in the loader disclosed in '553. Specifically, the disclosed paintball loader utilizes a plurality of fins spaced at such a distance as to create gaps to accommodate a single paintball. Due to the close proximity of the fins, there is a tendency for the paintballs to partially fall into a gap, which can result in a paintball jam. In addition, if a paintball breaks within the paintball loader, because of the large amount of fins and the small area of the gaps, cleaning the paintball loader can be difficult. Since existing paintball loaders utilizes several fins, space for which paintballs could be accommodated are lost to allow space for the fins. Thus, the paintball feed rate is reduced for each rotation of the cone because of this lost space.

It would be a distinct advantage to have a drive cone which feeds the paintballs at a faster rate, while preventing jams of partially fallen paintballs into the gaps located between the fins. It is an object of the present invention to provide such an apparatus.

SUMMARY OF THE INVENTION

In one aspect, the present invention is a rapid feed paintball loader for use on a paintball gun. The paintball loader includes a container for holding a plurality of paintballs and a drive cone rotatably mounted on a bottom portion of the container. At least one fin is affixed to a top feed surface of the drive cone. The fin divides or separates the top feed surface into at least gap or section which is preferably large enough to accommodate more than one paintball. The loader also includes a motor that rotates the drive cone. In addition, an exit tube exits from the bottom portion of the container and leads to an inlet tube of the paintball gun. The motor actuates upon demand.

In another aspect, the present invention is a drive cone for use on a paintball loader of a paintball gun having a container for holding a plurality of paintballs and an exit tube located on the container leading to the paintball gun. The drive cone includes a drive cone rotatably mounted on a bottom portion of the container and at least one fin affixed to a top feed surface of the drive cone. The fin divides or separates the top feed surface of the drive cone into at least one gap which is preferably large enough to accommodate more than one paintball. The drive cone receives paintballs from the container and drives the paintballs from the gap into the exit tube.

In still another aspect, the present invention is a rapid feed paintball loader for use on a paintball gun. The paintball loader includes a container for holding a plurality of paintballs and at least one fin located at a bottom portion of the container. The fin divides or separates the a top feed surface into at least one gap that is peferably large enough to accommodate at least one paintball. The fin rotates on an axis running perpendicularly through the bottom portion of the container. The paintball loader also includes an exit tube exiting from the bottom portion of the container and leads to an inlet tube of the paintball gun. The exit tube has a sloped exit portion. In addition, a tube extension is mounted on an interior surface of the container adjacent to the sloped exit portion of the exit tube. The tube extension is mounted at a height which is above the top feed surface of the fin and has a radius of curvature that is approximately equal to the radius of a paintball. The paintball loader also may include a deflector for deflecting paintballs downward into the gap or upward to pass over the tube extension. The deflector is pivotably mounted on the interior surface of the container adjacent to the tube extension. The deflector is mounted at a height which is above the top feed surface of the fin and which is below a bottom portion of the tube extension. A motor rotates the drive cone upon demand.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
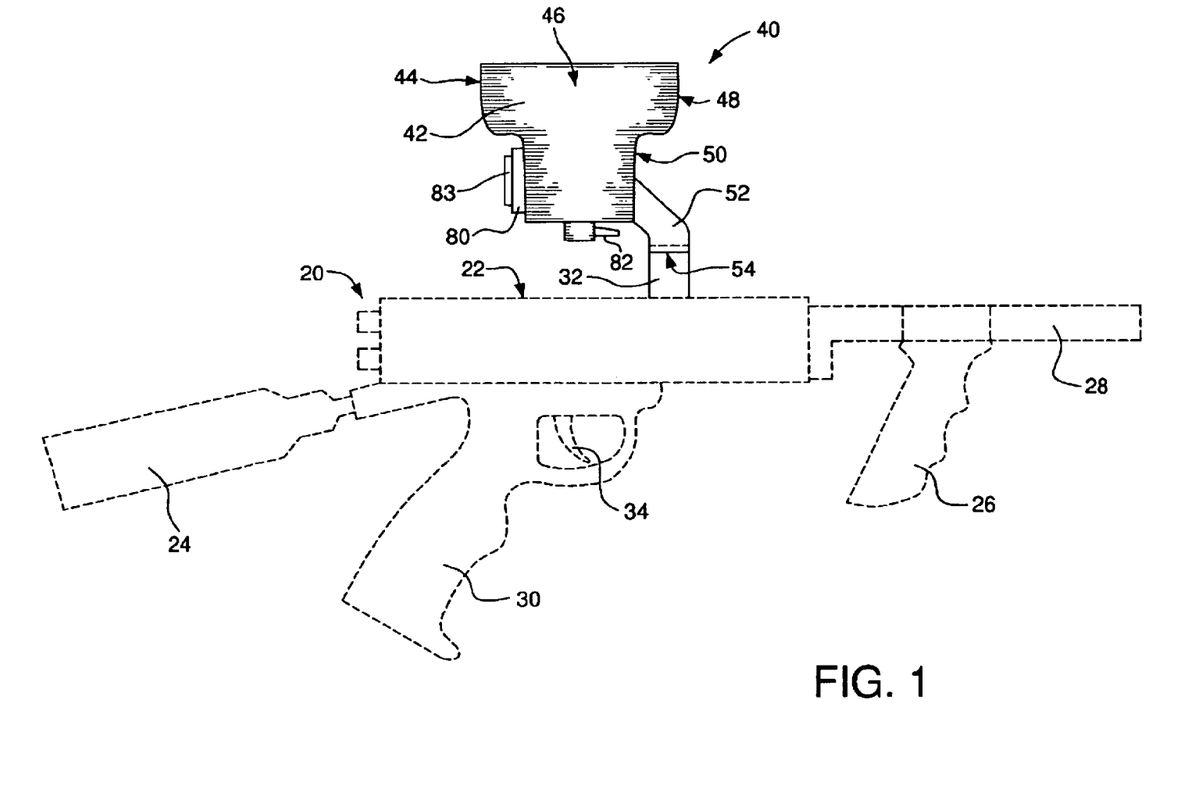
FIG. 1 is a side elevational view of a rapid feed paintball loader constructed in accordance with the teachings of the present invention and operatively attached to a representative paintball gun illustrated in phantom.

A drive cone for use in a paintball loader for rapidly delivering paintballs while preventing paintball jams is disclosed. FIG. 1 is a side elevational view of a rapid feed paintball loader 40 constructed in accordance with the teachings of the present invention and operatively attached to a representative paintball gun 20 illustrated in phantom. The paintball gun 20 includes a main body 22, a compressed gas cylinder 24, a front handgrip 26, a barrel 28, and a rear handgrip 30. The paintball gun also includes an inlet tube 32 leading to a firing chamber (not shown) in the interior of the main body and a trigger 34. The front handgrip projects downwardly from the barrel and provides an area for gripping by an operator of the paintball gun. The compressed gas cylinder is typically secured to a rear portion of the paintball gun. The compressed gas cylinder normally contains $CO_2$, although any compressible gas may be used.

In operating the paintball gun 20, the trigger 34 is squeezed, thereby actuating the compressed gas cylinder to release bursts of compressed gas. The bursts of gas are used to eject paintballs outwardly through the barrel 28. The paintballs are continually fed by the paintball loader 40 through the inlet tube to the firing chamber. Although FIG. 1 depicts an automatic paintball gun, the paintball gun 20 may also be a semi-automatic gun.

The rapid feed paintball loader 40 includes a paintball container 42 having a container wall 44 forming an interior area 46. The container is divided into an upper portion 48 and a lower portion 50. An exit tube 52 leads from the bottom portion of the container to an outlet opening 54. The exit tube is positioned on top of the inlet tube 32 of the paintball gun 20.

Figure 2:
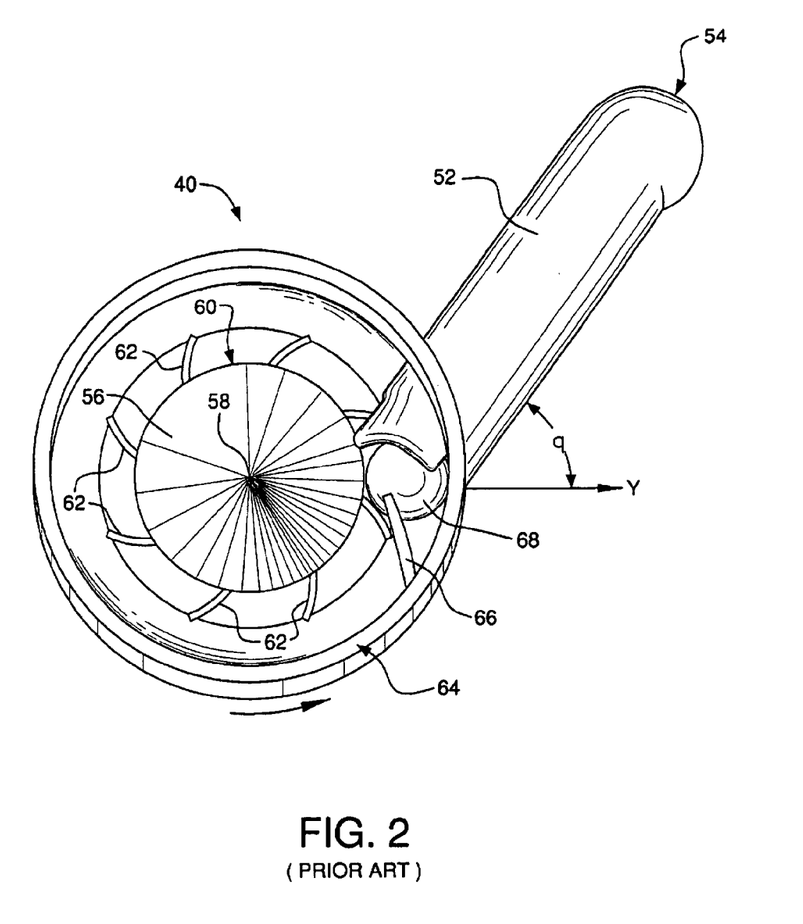
FIG. 2 (Prior Art) is a top view of the lower portion of the rapid feed paintball loader of FIG. 1 showing a drive cone of an existing paintball loader.

FIG. 2 is a top view of the lower portion 50 of the rapid feed paintball loader of FIG. 1 showing a drive cone 56 of an existing paintball loader 40. Mounted along a vertical center axis 58, located in the approximate center of the interior area, is the drive cone 56 having a conically-shaped interior surface area 60 with a plurality of fins 62 projecting upwardly from the top surface of the drive cone and spiraling outwardly from an outer circumference of the interior area. The drive cone is rotatably attached to a bottom portion of the paintball container, allowing rotation about the center axis. The exit tube 52 projects outwardly from a rim 64 of the lower portion 50 of the container wall 44 at an approximately 45 degree angle from the Y-axis. In addition, an upper part of the exit tube extends towards the interior area to form a paintball tube extension 72. A pivotable deflector 66 extends inwardly towards the vertical center axis from the rim 64. A paintball 68 is illustrated between two fins.

The drive cone 56 shown in FIG. 2 positions the plurality of fins 62 in such a fashion that only one paintball 68 may fit in between two fins. Since only one paintball may fit in each gap, there is an increased possibility that a paintball may only partially fall into the gap. By merely falling partially into the gap, the paintball may cause a jam. Additionally, since there are several fins located on the drive cone, the space used for accommodating paintballs is reduced by the number of fins. Also, when a paintball breaks within the paintball loader 40, since there are so many fins, and the gaps between the fins are relatively small, cleaning the residue of the broken paintball may be very difficult.

Figure 3:
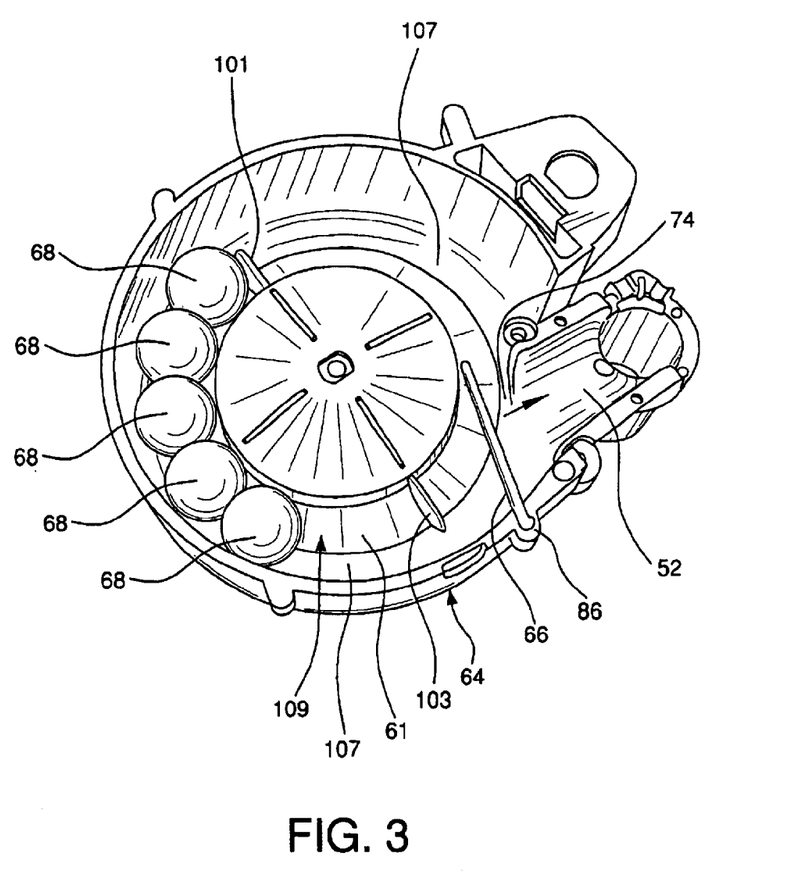
FIG. 3 is a top interior cutaway view of the paintball loader illustrating an improved cone, the exit tube, and a plurality of paintballs in the preferred embodiment of the present invention.

FIG. 3 is a top interior cutaway view of the paintball loader 40 illustrating an improved cone 99, the exit tube 52, and a plurality of paintballs 68 in the preferred embodiment of the present invention. The container wall 44 is curved and extends upwards to form the upper portion 48 (not shown in FIG. 3). The interior area 46 formed by the container wall stores a plurality of paintballs prior to being used by the paintball gun 20. Although a circular shape is illustrated in the top view of FIG. 2, the container may be any size and shape which permits the paintballs to drop towards the drive cone 99.

Figure 4:
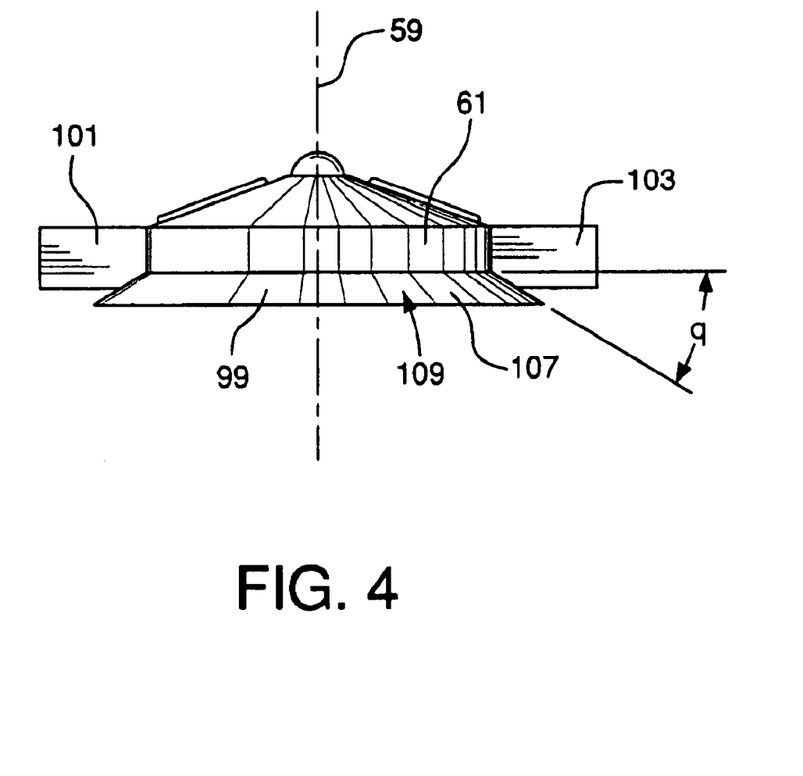
FIG. 4 is a side view of the drive cone of FIG. 3 separated from the paintball loader in the preferred embodiment of the present invention.
Figure 5:
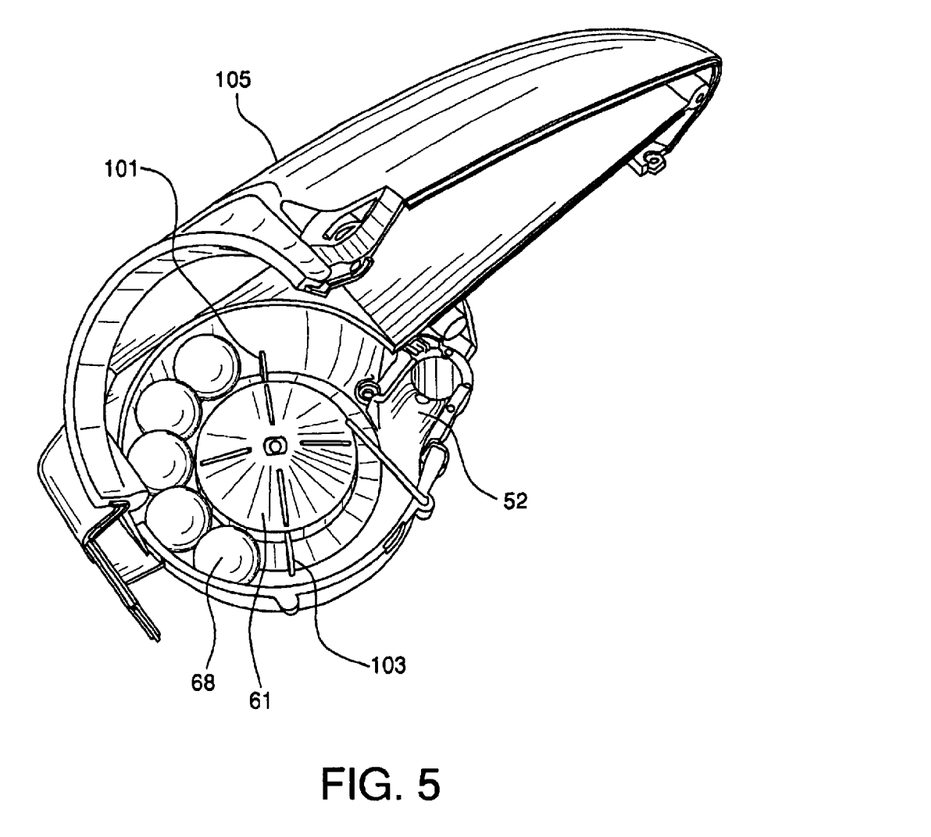
FIG. 5 is a top interior cutaway view of the paintball loader illustrating the improved drive cone, the exit tube, a plurality of paintballs, and an outer shell of the paintball loader in the preferred embodiment of the present invention.
Figure 6:
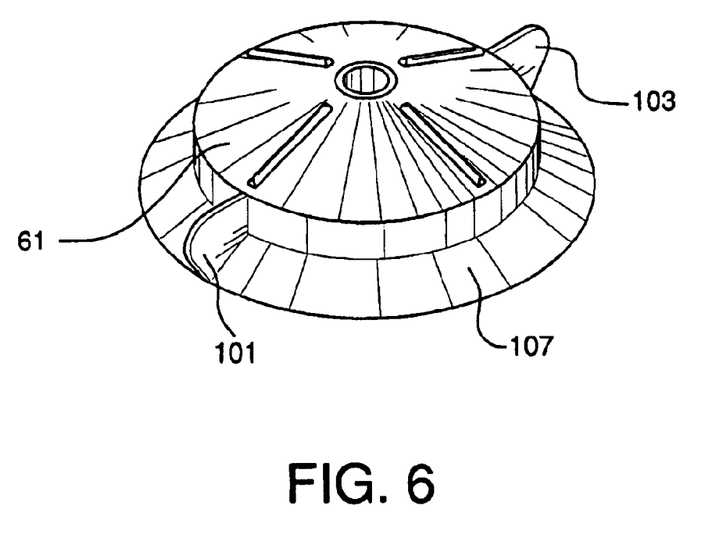
FIG. 6 illustrates a top perspective view of the drive cone of FIG. 4.

FIG. 4 is a side view of the drive cone 99 of FIG. 3 separated from the paintball loader 40 in the preferred embodiment of the present invention. In the preferred embodiment of the present invention, the drive cone 99 includes two fins 101 and 103. FIG. 5 is a top interior cutaway view of the paintball loader 40 illustrating the improved drive cone 99, the exit tube 52, a plurality of paintballs 68, and an outer shell 105 of the paintball loader in the preferred embodiment of the present invention. FIG. 6 illustrates a top perspective view of the drive cone 99 of FIG. 4.

Referring to FIGS. 3–6, the drive cone includes a conically-shaped interior area 61. The two fins originate at an outer circumference of the interior area 61 and project outwardly towards the rim 64 of the container wall 44. Between each fin is an enlarged gap 107 which may accommodate a plurality of paintballs 68 (as illustrated, five paintballs may be positioned between each gap 107). However, the drive cone may be sized to accommodate any amount of paintballs.

A feed surface 109 of the drive cone 99, which is the feed surface between the fins 101 and 103 where the paintball 68 rests, is sloped downwardly at an angle of $\Phi$ (approximately 45 degrees in the preferred embodiment). The surface is preferably sloped at any angle which matches the slope of the exit tube and allows paintballs to feed into the exit tube 52. However, any slope angle may be utilized by the feed surface. The exit tube is a circular tube with an inside diameter slightly larger than a conventional paintball. The exit tube leads from an entry opening 74 to the outlet opening 54 which engages with the inlet tube 32 of the paintball gun. The exit tube includes a sloped exit portion 76 and a vertical outlet portion 78. In the preferred embodiment of the present invention, the sloped exit portion of the exit tube is sloped downwardly at an angle of approximately $\Phi$, which is the same slope as the top feed surface of the drive cone. The pivotable deflector 66 is positioned above the top portion of the fins 101 and 103 and below the tube extension 72.

A tube extension (not shown) is preferably located at the entry opening 74. The tube extension is an extension of the exit tub. The tube extension extends towards a center axis 59, while maintaining a clearance above the fins 101 and 103. The paintball tube extension is formed as a scoop which has an interior radius of curvature approximately equal to the curvature of a paintball. The top of the scoop is positioned so that it partially covers a paintball that is pushed into position by the fins at the entry opening 74 of the exit tube. In this manner, the sloped surface of the drive cone, the fins, the angled orientation (approximately 45 degrees) of the exit tube, and the tube extension all equate to forcibly drive the paintball into the exit tube.

The drive cone 56 is rotated around the center axis 59 by a drive motor (not shown). Additionally, the pivotable deflector 66 may be installed within the loader 40. The pivotable deflector is attached to the rim 64 at pivot point 86, allowing the deflector to rotatably move as indicated in FIG. 3.

Referring to FIGS. 1, and 3–6, the operation of the rapid feed paintball loader 40 having the improved drive cone 99 will now be explained. The rapid feed paintball loader is positioned on the top of the paintball gun 20. The loader 40 is connected to the gun by attaching the exit tube 52, at the outlet opening 54, to the inlet tube 32 with an attaching device such as a clamp (not shown).

When an operator of the paintball gun 20 wishes to shoot paintballs, the trigger 34 is squeezed, which actuates the compressed gas cylinder 24. The compressed gas cylinder releases bursts of compressed gas which are used to eject paintballs through the barrel 28. A plurality of paintballs are stored in the paintball container 42 and pass down the exit tube for use by the paintball gun when demanded by the operator.

The plurality of paintballs located in the container 42 rest on top of the drive cone 99. The bottom-most paintballs drop into either of the two enlarged gaps 107. The drive cone is rotated by the drive motor, forcing the paintballs outward and downward from the center axis 59 and forward toward the tube extension (not shown). The pivotable deflector 66 helps prevent jams by causing paintballs to either fall into one of the gaps between the fins or to rise above the tube extension. The paintball 68 is forced into the entry opening 74 of the exit tube 52 by the tube extension. In addition, since the drive cone is downwardly sloped toward the exit tube, the paintball falls downwardly, with the assistance of gravity, and outwardly towards the rim 64.

After the paintball enters the entry opening, the next paintball located adjacent the first paintball within the gap 107 is sequentially grasped by the tube extension and driven into the entry opening behind the first paintball. Additional paintballs located in the container 42, are drawn downwardly and outwardly by gravity and fill the vacated gaps. Positioning the fins on the outer circumference of the interior dome-shaped area prevents paintballs from being lodged in the upper portions of the gaps.

Once the paintball 68 enters the entry opening 74, it passes through the sloped exit portion to a vertical outlet portion (not shown) of the exit tube. As the paintball passes through the exit tube, the paintball may actuate an optional electro-mechanical motor actuator switch (not shown). The motor actuator switch may be utilized to detect the paintball passing through the exit tube. When the paintball enters the exit tube, the motor actuator detects the paintball in the exit tube and shuts off the motor. Thus, when the exit tube fills up with paintballs, the motor is automatically turned off. Then as paintballs vacate the exit tube, the motor actuator does not detect a paintball and engages the motor and rotates the drive cone 99. In this way, the exit tube is always kept full of paintballs, ready for use when demanded by the paintball gun.

Although an electromechanical switch has been described to detect the presence of paintballs in the exit tube, it should be understood that other devices may also be utilized to detect the paintballs (e.g., infrared senors, contact pads, optical sensors, etc.), without departing from the scope of the present invention. In the preferred embodiment, a reflective infrared (IR) optical sensor (not shown) may be utilized.

The pivotable deflector 66 may optionally be used to provide an additional, active device to prevent the jamming of paintballs within the paintball loader. In existing paintball loaders, a paintball may be lodged between the tube extension or entry opening of the exit tube and one of the fins or "agitators" driving the paintball towards the exit tube, causing the loader to jam and stopping the rotation of the drive cone. To prevent the paintball from lodging between the tube extension (or extension of the exit tube in existing loaders) and a fin (or agitator in existing loaders), the pivotable deflector forces the paintball to either fall into one of the gaps between the fins or to rise upwardly away from the tube extension. In addition, the deflector pivots away from the paintball, thus preventing the paintball from lodging between the fin and the deflector. The deflector, although depicted with the paintball loader 40 illustrated in FIGS. 1–5, may be utilized on any active feed paintball loader to prevent the inadvertent lodging of paintballs between a fin (or other agitating device) and the entry of the exit tube.

The improved drive cone provides many advantages over existing drive cones. First of all, by enlarging the gaps to allow the accommodation of more paintballs, more paintballs are fed into the entry opening 74 for each rotation of the drive cone. By feeding the paintballs at a greater rate per rotation of the drive cone, the drive cone enables the paintball loader to feed the paintball gun at a faster rate than existing drive cones. In addition, in existing paintball drive cones, the gaps between the fins only allow the accommodation of a single paintball. This reduced area in existing drive cones results in an increased likelihood that the paintball may only partially fall into the smaller gap. When the paintball can only fall partially into the smaller gap of the existing drive cones, a jam results between the paintball and fin. With the improved drive cone 99, the paintball has a large area for which the paintball may fall into. This results in less partial drops of the paintballs into the gaps, which decreases or eliminate any jams which may occur.

The improved drive also allows for easy cleanup of the interior of the paintball loader when paintballs break within the loader. In addition, the improved drive cone 99 allows for manual feeding of the paintball when the feed system of the paintball loader malfunctions. For example, when a motor fails on the paintball loader, a paintball gun operator need only shake the gun to move the paintballs into the gun.

Figure 7:
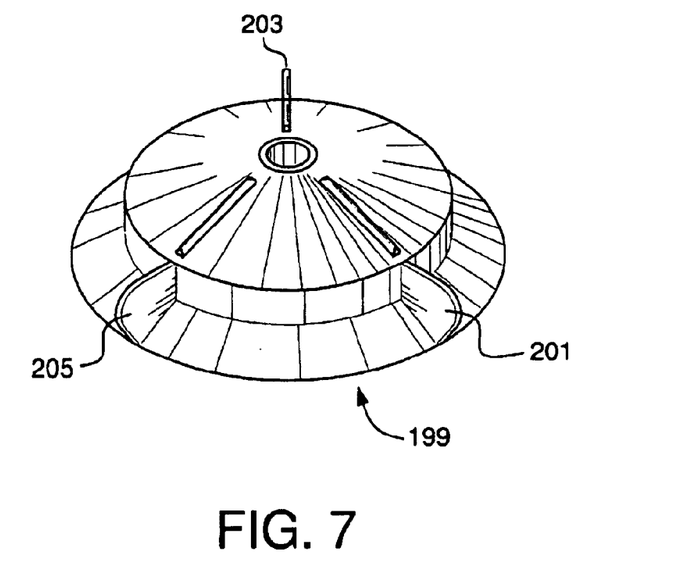
FIG. 7 illustrates a separate drive cone having three fins in a first alternate embodiment of the present invention.
Figure 8:
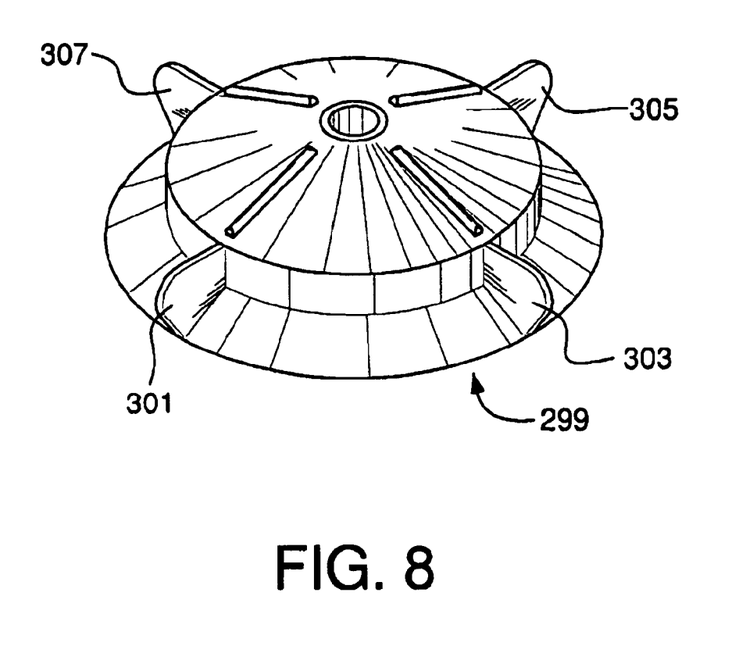
FIG. 8 illustrates a drive cone having four fins in a second alternate embodiment of the present invention.
Figure 9:
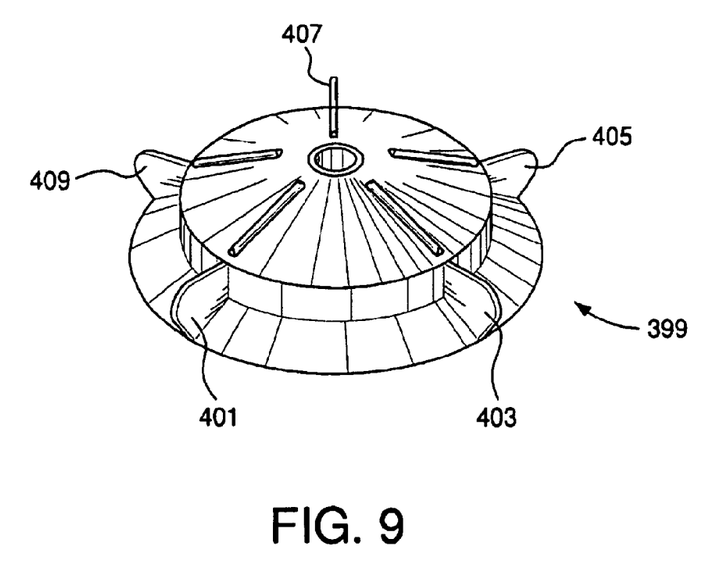
FIG. 9 illustrates a separate drive cone having five fins in a third alternate embodiment of the present invention.

The improved drive cone 99 only requires one fin 101. However, in alternate embodiments of the present invention, the drive cone may have more than one fin. FIG. 7 illustrates a separate drive cone 199 having three fins 201, 203, and 205 in a first alternate embodiment of the present invention. FIG. 8 illustrates a drive cone 299 having four fins 301, 303, 305, and 307 in a second alternate embodiment of the present invention. FIG. 9 illustrates a separate drive cone 399 having five fins 401, 403, 405, 407, and 409 in a third alternate embodiment of the present invention. It should be understood that the drive cone may have any number of fins which allows the accommodation of more than one paintball within each formed gap. In addition, the drive cone may be used on a wide variety of paintball loaders.

In the preferred embodiment of the present invention, the paintball loader may include a microprocessor to enhance the performance of the loader as well as providing useful information to a paintball gun operator. The microprocessor also deactivates the drive motor when the exit tube is full. The microprocessor is attached to the motor actuator switch and the motor. When the motor actuator switch detects the presence of a paintball at the top of the exit tube, the motor actuator switch sends a signal to the microprocessor. In turn, the microprocessor sends a signal to disengage the motor. When the motor actuator switch does not detect any paintballs within the exit tube, the motor actuator switch signals the microprocessor that the exit tube is empty. The microprocessor can then signal the motor to engage and rotate the drive cone, providing additional paintballs to the paintball gun.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. A rapid feed paintball loader for use on a paintball gun for force feeding paintballs, the paintball loader comprising:
   a container for holding a plurality of paintballs;
   a drive cone rotatably mounted on a bottom portion of said container;
   at least one fin affixed to a top feed surface of said drive cone, said fin separating the top feed surface of the drive cone into at least one gap large enough to accommodate more than one paintball;
   a motor that rotates said drive cone;
   an exit tube exiting from the bottom portion of said container and leading to an inlet tube of the paintball gun; and
   means for actuating said motor upon demand;
   whereby said drive cone receives paintballs from the container and forces the paintballs from the gap into the exit tube,
   wherein the means for actuating the motor includes a microprocessor.

2. The rapid feed paintball loader of claim 1, wherein the microprocessor is in communication with a sensor for detecting the presence of a paintball and the motor.

3. The rapid feed paintball loader of claim 2, wherein the sensor is an electro-mechanical switch.

4. The rapid feed paintball loader of claim 2, wherein the sensor is a reflective infrared sensor.

5. A rapid feed paintball loader for use on a paintball gun for force feeding paintballs, the paintball loader comprising:
   a container for holding a plurality of paintballs;
   a drive cone rotatably mounted on a bottom portion of said container;
   at least one fin affixed to a top feed surface of said drive cone, said fin separating the top feed surface of the drive cone into at least one gap large enough to accommodate more than one paintball;
   a motor that rotates said drive cone;
   an exit tube exiting from the bottom portion of said container and loading to an inlet tube of the paintball gun; and
   means for actuating said motor upon demand;
   whereby said drive cone receives paintballs from the container and forces the paintballs from the gap into the exit tube,
   wherein the top feed surface slopes downward from a center axis of said drive cone.

6. A rapid feed paintball loader for use on a paintball gun for force feeding paintballs, the paintball loader comprising:
   a container for holding a plurality of paintballs;
   a drive cone rotatably mounted on a bottom portion of said container;
   at least one fin affixed to a top feed surface of said drive cone, said fin separating the top feed surface of the drive cone into at least one gap large enough to accommodate more than one paintball;
   a motor that rotates said drive cone;
   an exit tube exiting from the bottom portion of said container and leading to an inlet tube of the paintball gun; and
   means for actuating said motor upon demand;
   whereby said drive cone receives paintballs from the container and forces the paintballs from the gap into the exit tube; and
   a tube extension mounted on an interior surface of said container adjacent to said exit tube.

7. The rapid feed paintball loader of claim 6, further comprising a deflector for deflecting paintballs downward into the gap or upward to pass over the tube extension, said deflector pivotably attached to the interior surface of said container adjacent to the tube extension, said deflector being mounted at a height above a top surface of said drive cone and below a bottom portion of said tube extension.

8. The rapid feed paintball loader of claim 7 wherein said tube extension is mounted at a height which is above the top feed surface of said fin and having a radius of curvature that is approximately equal to the radius of a paintball.

9. A rapid paintball loader for use on a paintball gun for force feeding paintballs, the paintball loader comprising:
   a container for holding a plurality of paintballs;
   a drive cone rotatably mounted on a bottom portion of said container;
   at least one fin affixed to a top feed surface of said drive cone, said fin separating the top feed surface of the drive cone into at least one gap large enough to accommodate more than one paintball;
   a motor that rotates said drive cone;
   an exit tube exiting from the bottom portion of said container and leading to an inlet tube of the paintball gun; and
   means for actuating said motor upon demand;
   whereby said drive cone receives paintballs from the container and forces the paintballs from the gap into the exit tube,
   wherein said exit tube includes a sloped exit portion.

10. The rapid feed paintball loader of claim 9 wherein the sloped exit portion has a slope approximately equivalent to the slope of the top feed surface of said drive cone.

11. The rapid feed paintball loader of claim 9 wherein, the drive cone includes an interior area and wherein said fin projects outwardly from the interior area of said drive cone.

12. The rapid feed paintball loader of claim 9 wherein said drive cone includes two fins forming a gap with an adjacent fin large enough to accommodate more than one paintball.

13. The rapid feed paintball loader of claim 9 wherein said drive cone includes at least two fins forming a gap with an adjacent fin large enough to accommodate more than one paintball.

14. A rapid feed paintball loader for use on a paintball gun for force feeding paintballs, the paintball loader comprising:

a container for holding a plurality of paintballs;

a drive cone rotatably mounted on a bottom portion of said container;

at least one fin affixed to a top feed surface of said drive cone, said fin separating the top feed surface of the drive cone into at least one gap large enough to accommodate more than one paintball;

a motor that rotates said drive cone;

an exit tube exiting from the bottom portion of said container and leading to an inlet tube of the paintball gun; and means for actuating said motor upon demand;

whereby said drive cone receives paintballs from the container and forces the paintballs from the gap into the exit tube, wherein the exit tube is orientated approximately 45 degrees from a horizontal axis running through a mid position of the paintball loader.

15. A rapid feed paintball loader for use on a paintball gun for force feeding paintballs, the paintball loader comprising:

a container for holding a plurality of paintballs;

a drive cone rotatably mounted on a bottom portion of said container;

at least one fin affixed to a top feed surface of said drive cone, said fin separating the top feed surface of the drive cone into at least one gap large enough to accommodate more than one paintball;

a motor that rotates said drive cone;

an exit tube exiting from the bottom portion of said container and leading to an inlet tube of the paintball gun; and means for actuating said motor upon demand;

whereby said drive cone receives paintballs from the container and forces the paintballs from the gap into the exit tube, wherein the drive cone includes a dome-shaped area located within its center and wherein said fin projects outwardly from the dome-shaped area.

16. A drive cone for use on a paintball loader of a paintball gun having a container for holding a plurality of paintballs and an exit tube located on the container leading to the paintball gun, the drive cone comprising:

a top feed surface rotatably mounted on a bottom portion of the container; and at least one fin affixed to the top feed surface of said drive cone, said fin separating the top feed surface into at least one gap, the gap being large enough to accommodate more than one paintball;

whereby said drive cone receives paintballs from the container and forces the paintballs from the gap into the exit tube, wherein the drive cone further includes an interior dome-shaped area located within its center and wherein the fin projects outwardly from the dome-shaped area.

17. The drive cone of claim 16 further comprising a motor that rotates said drive cone.

18. The drive cone of claim 16 wherein the drive cone includes at least two fins forming a gap with an adjacent fin large enough to accommodate more than one paintball.

19. A rapid feed paintball loader for use on a paintball gun, the paintball loader comprising:

a container for holding a plurality of paintballs;

a top feed surface rotatably mounted in the container near its bottom, the top feed surface adapted to at least partially support paintballs;

at least one fin separating the top feed surface into at least one gap large enough to accommodate at least one paintball;

means for rotating said fin about an axis running perpendicularly through the bottom portion of said container;

an exit tube exiting from the bottom portion of said container and leading to an inlet tube of the paintball gun, said exit tube having a sloped exit portion, wherein said fin forces the paintballs into the exit tube;

a tube extension mounted on an interior surface of said container adjacent to the sloped exit portion of said exit tube, said tube extension being mounted at a height which is above the top feed surface and having a radius of curvatrue that is approximately equal to the radius of a paintball;

a deflector for deflecting paintballs downward into the gap or upward to pass over said tube extension, said deflector pivotably mounted on the interior surface of said container adjacent to said tube extension, said deflector being mounted at a height which is above the top feed surface and which is below a bottom portion of said tube extension;

a motor that rotates said drive fin; and means for actuating said motor upon demand.

20. The rapid feed paintball loader of claim 19 wherein the loader includes at least two fins forming a gap with an adjacent fin large enough to accommodate more than one paintball.

21. The rapid feed paintball loader of claim 19, wherein the means for actuating the motor includes a microprocessor.

22. The rapid feed paintball loader of claim 21, wherein the microprocessor is in communication with a sensor for detecting the presence of a paintball and the motor.

23. The rapid feed paintball loader of claim 22, wherein the sensor is an electro-mechanical switch.

24. The rapid feed paintball loader of claim 22, wherein the sensor is a reflective infrared sensor.

* * * * *

UNITED STATES PATENT AND TRADEMARK OFFICE
CERTIFICATE OF CORRECTION

| | | |
|---|---|---|
| PATENT NO. | : 6,792,933 B2 | Page 1 of 1 |
| APPLICATION NO. | : 09/949440 | |
| DATED | : September 21, 2004 | |
| INVENTOR(S) | : Christopher et al. | |

It is certified that error appears in the above-identified patent and that said Letters Patent is hereby corrected as shown below:

IN THE SPECIFICATION
At column 2, line 5, after the word "least", insert --one--.

IN THE CLAIMS
In claim 19, column 10, line 39, after the word "said", delete "drive".

Signed and Sealed this

Sixth Day of November, 2007

JON W. DUDAS
*Director of the United States Patent and Trademark Office*